Aug. 13, 1929.                R. RAPELLIN                1,724,617
                              GREASE GUN
                           Filed Oct. 1, 1927
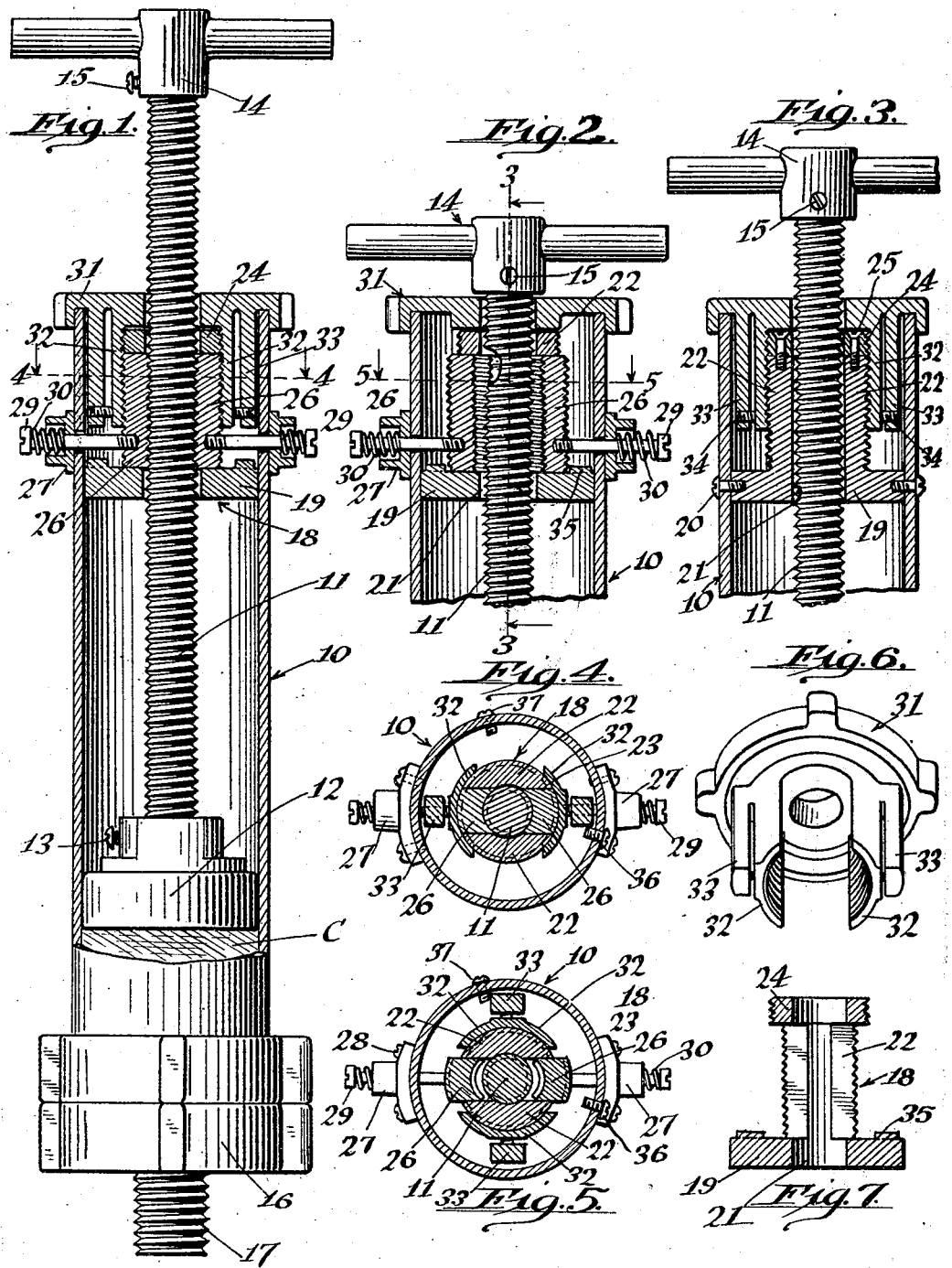
Inventor
René Rapellin
by Hazard and Miller
Attorneys Patented Aug. 13, 1929.

1,724,617

UNITED STATES PATENT OFFICE.

RENÉ RAPELLIN, OF LOS ANGELES, CALIFORNIA.

GREASE GUN.

Application filed October 1, 1927. Serial No. 223,385.

This invention relates to improvements in grease guns and may be considered as an improvement over the grease gun disclosed in my pending application, Serial No. 216,552 filed August 31, 1927.

An object of this invention is to provide an improved grease gun wherein there is a barrel within which a piston having a threaded piston rod is reciprocable, and to provide an improved construction for establishing and disconnecting a threaded engagement between the piston rod and the barrel. By this construction it is possible on disconnecting the threaded engagement between the barrel and the piston rod, to move the piston and piston rod bodily without rotating it, and when the fluid to be discharged from the barrel is a relatively light oil, the grease gun can be used in this manner for discharging the contents of the gun. When a relatively heavy grease is employed, the threaded engagement between the piston rod and the barrel may be established, and in such position, in order to advance the piston, it is necessary to rotate the piston rod, thus developing a great mechanical advantage enabling the grease to be discharged from the gun.

The improved grease gun contemplates a novel means for establishing and disconnecting the threaded engagement between the barrel and the grease gun. An object of the invention is to provide a construction wherein there are threaded means adapted to be placed in engagement with the threaded piston rod, and a rotatable cap on the barrel is capable of being rotated to hold the threaded means in engagement with the piston rod.

With the foregoing and other objects in view which will be made manifest in the following detailed description and specifically pointed out in the appended claims, reference is had to the accompanying drawings for an illustrative embodiment of the invention, wherein:

Figure 1 is a view in side elevation of the improved grease gun, parts being broken away and shown in vertical section, the grease gun being shown in that position wherein there is a threaded connection provided between the barrel and the threaded piston rod.

Fig. 2 is a partial view in vertical section similar to Figure 1, illustrating the threaded connection between the barrel and the piston rod as having been disconnected.

Fig. 3 is a vertical section taken upon the line 3—3 upon Figure 2.

Fig. 4 is a horizontal section taken upon the line 4—4 upon Figure 1.

Fig. 5 is a horizontal section taken upon the line 5—5 upon Figure 2.

Fig. 6 is a perspective view of the rotatable cap on the barrel.

Fig. 7 is a vertical section through a part of the grease gun.

Referring to the accompanying drawings wherein similar reference characters designate similar parts throughout, the improved grease gun consists of a barrel 10 into which extends a threaded piston rod 11. A piston 12 is secured to the lower end of the piston rod by means of a set screw 13. On the upper end of the piston rod 11 there is screwed a handle 14 which is held in place by a set screw 15. On the bottom of the barrel there is threaded a cap 16 having a threaded nipple 17 to which a hose may be connected. The cap 16 can be removed from the barrel 10 for refilling purposes. Within the barrel 10 adjacent its upper end there is positioned a member generally designated at 18, shown in Figure 7. This member has a disc-like bottom 19 which snugly fits the interior of the barrel and which is secured thereto by means of screws 20. Above the bottom 19 and on opposite sides of the central aperture 21, there extend two arms 22 which are separated from each other by diametrical slots 23. These slots have parallel sides and are of slightly less width than the diameter of the threaded piston rod 11. The exterior surfaces of the two arms 22 are cylindrical and threaded, and they are connected at their upper ends by means of an externally threaded ring 24 fastened to the arms by means of screws 25. The ring 24 merely serves to strengthen the arms and hold them in place about the piston rod. Blocks 26 are slidable within the slots 23 and have their opposed faces threaded with threads complementary to the threads on the piston rod 11. These blocks also have their exterior surfaces threaded with threads adapted to form continuations of the threads on the exterior surfaces of the arms 22. The blocks are of such thickness that when the inside threads are in engagement with the piston rod 11, the outside threads will be in alignment with the threads on the arms 22. On the outside of the barrel 10 opposite the blocks 26, there are fastened sockets 27 which are fastened in place by means of screws 28. Pins or screws 29 extend through the sockets and through the barrel and have their inner ends screwed into tapped holes in the blocks 26. Coil springs 30 are compressed between the heads of the screws 29 and the sockets, urging the screws outwardly, and consequently, urging the blocks 26 to be drawn outwardly or disengaged from the piston rod 11. On the upper end of the barrel there is positioned a cap 31 which has two depending diametrically opposite arms 32. These arms present semi-cylindrical interior surfaces which are spaced from each other a distance equal to the diameter across the arms 22. These arms are somewhat wider than the blocks 26 and have formed on their opposed surfaces, threads which are complementary to the threads on the outside of the ring 24 and on the outside of the arms 22 and the blocks 26. While the arms 32 are wider than the blocks 26, they are somewhat narrower than the arms 22 so that they can be caused to assume the position shown in Figure 5, wherein they completely uncover the exterior surfaces of the blocks 26, enabling the springs 30 to withdraw the blocks from engagement with the piston rod 11. The arms 32 are relatively thin, and between these arms and the interior of the barrel 10, the cap carries depending arms 33 which are relatively heavy so as to be strong and rugged. These arms carry screws 34 which are adapted to be tightened into engagement with the lower ends of arms 32 so as to keep the arms 32 in engagement with the upstanding arms 22 and to take up wear on the threads. On the top surface of the disc-like bottom 19, there are formed projections 35 opposite the slots 23. These projections are adapted to be engaged by the bottoms of the blocks 26 so that the outward movement of the blocks will be limited thereby.

The operation of the improved grease gun is as follows:

In order to establish the threaded connection between the barrel 10 and the threaded piston rod 11, the heads of the two screws 29 are pressed inwardly, causing the blocks 26 to slide into threaded engagement with the piston rod. When in this position, the exterior surfaces of the blocks form continuations of the cylindrical surfaces on the outside of the arms 22, and while the blocks are in this position the cap 31 can be rotated on the barrel from the position shown in Figures 2 and 5, into the position shown in Figures 1 and 4. In this position, the arms 32 are over the ends or outside surfaces of the blocks 26 and hold them in engagement with the piston rod against the action of the springs 30. When the threaded engagement is thus established, in order to advance the piston 12 to discharge the contents C, it is necessary to rotate the piston rod by the handle 14. When, however, it is possible to discharge the contents of the barrel by manually shifting the piston, piston rod and handle without rotation, the cap 31 is reversely rotated so that the arms 32 will move from the position shown in Figure 4 to the position shown in Figure 5, enabling the blocks 26 to be drawn out of engagement with the piston rod 11 by the springs 30. In this position, the piston rod can be caused to slide through the member 18, the ring 24 and the cap 31. It will be appreciated that in order to establish the threaded connection between the barrel and piston rod, it is merely necessary to press the heads of the screws 29 toward each other and then rotate the cap 31; and in order to disconnect the threaded connection, it is merely necessary to reversely rotate the cap 31. The rotation of the cap 31 can be limited by means of screws 36 and 37 on the barrel, adapted to be engaged by one of the strengthening arms 33.

From the above described construction, it will be appreciated that the improved grease gun has a novel means for establishing a threaded connection between the barrel and the threaded piston rod, which is of extremely quick and simple operation.

Various changes in the details of construction may be made without departing from the spirit or scope of the invention as defined by the appended claims.

I claim:

1. A construction associated with a feed screw comprising a rotatable cap through which the feed screw slidably extends, threaded members adapted to be moved into or out of engagement with the feed screw, guide means for guiding said threaded member, said cap carrying means adapted to engage the threaded members and hold them in engagement with the said screw, and arms carried by said cap, said arms having adjusted screws mounted thereon engageable upon said means as and for the purpose described.

2. A construction associated with a feed screw comprising guide means through which the feed screw slidably extends, threaded members slidable through openings in the guide means adapted to engage the feed screw, and rotatable means threadedly mounted upon the guide means adapted to engage the backs of the threaded members upon rotation to hold them in engagement with the feed screw.

3. A construction associated with a feed screw comprising guide means through which the feed screw slidably extends, threaded members slidable through openings in the guide means adapted to engage the feed screw, and rotatable means threadedly mounted upon the guide means adapted to engage the backs of the threaded members upon rotation to hold them in engagement with the feed screw, and spring means urging the threaded members out of engagement with the feed screw.

In testimony whereof I have signed my name to this specification.

RENÉ RAPELLIN.